J., W. H. & E. R. WILLIAMS.

DISINFECTOR OR DEODORIZER.

APPLICATION FILED APR. 21, 1911.

Reissued Apr. 8, 1913.

13,551.

3 SHEETS—SHEET 1.

WITNESSES:

Fred H. Miller

W. C. Lyon

INVENTORS.

Joseph Williams,

William H. Williams, and Edward R. Williams,

By Fredk H. Hunter

Atty.

COLUMBIA PLANOGRAPH CO., WASHINGTON, D. C.

J., W. H. & E. R. WILLIAMS.

DISINFECTOR OR DEODORIZER.

APPLICATION FILED APR. 21, 1911.

Reissued Apr. 8, 1913.

13,551.

3 SHEETS—SHEET 2.

WITNESSES:

Fred H. Miller

W. C. Lyon

INVENTORS.

Joseph Williams,

William H. Williams and Edward R. Williams

By Fredk H. Miller Atty.

COLUMBIA PLANOGRAPH CO., WASHINGTON, D. C.

J., W. H. & E. R. WILLIAMS.
DISINFECTOR OR DEODORIZER.
APPLICATION FILED APR. 21, 1911.
Reissued Apr. 8, 1913.
13,551.
3 SHEETS—SHEET 3.
Fig. 10.
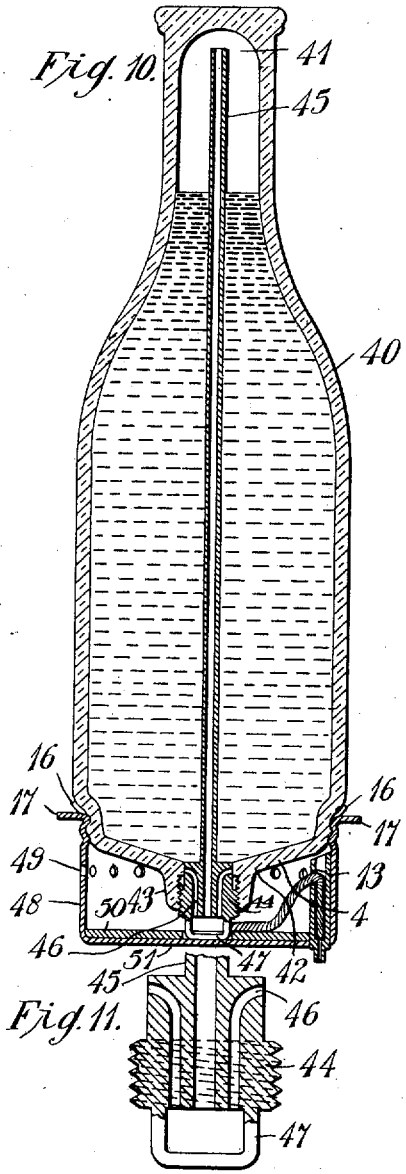
Fig. 11.
Fig. 12.
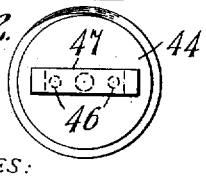
Fig. 13.
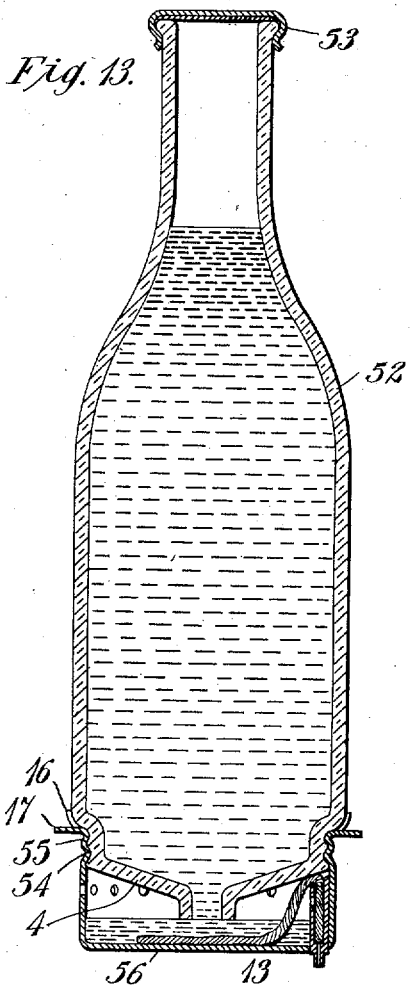
Fig. 14.
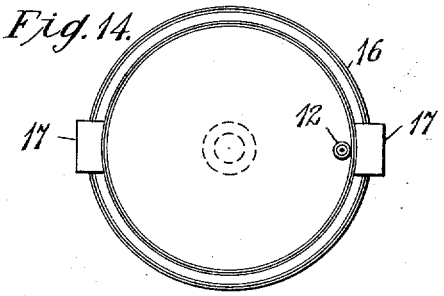
WITNESSES:
Fred H. Miller
W. C. Lyon
INVENTORS.
Joseph Williams,
William H. Williams,
and Edward R. Williams,
By Frick & Hunter
Atty.
COLUMBIA PLANOGRAPH CO., WASHINGTON, D. C.

UNITED STATES PATENT OFFICE.

JOSEPH WILLIAMS, WILLIAM H. WILLIAMS, AND EDWARD R. WILLIAMS, OF SHARPSBURG, PENNSYLVANIA.

DISINFECTOR OR DEODORIZER.

13,551. Specification of Reissued Letters Patent. Reissued Apr. 8, 1913.

Original No. 963,492, dated July 5, 1910, Serial No. 507,342. Application for reissue filed April 21, 1911. Serial No. 622,626.

*To all whom it may concern:*

Be it known that we, JOSEPH WILLIAMS, WILLIAM H. WILLIAMS, and EDWARD R. WILLIAMS, citizens of the United States, residing at Sharpsburg, in the county of Allegheny and State of Pennsylvania, have invented new and useful Improvements in Disinfectors or Deodorizers, of which the following is a specification.

Our invention relates to disinfectors or deodorizers and it has for one of its objects to provide a deodorizer or disinfector with means, as hereinafter set forth, to allow for the rapid escape by evaporation of the deodorant or disinfectant, or the convenient discharge in drops to the place or object desired to be deodorized or disinfected.

Further objects of our invention are to provide, in a manner hereinafter set forth, a deodorizer or disinfector which shall be simple of construction, strong, durable, efficient in use, conveniently supported in its operative position, and inexpensive to manufacture.

With the foregoing and other objects in view, our invention consists in the novel construction, combination and arrangement of parts as hereinafter more specifically described and illustrated in the accompanying drawings wherein is shown the preferred embodiment of the invention, but it is to be understood that changes, variations, and modifications may be resorted to which will fall within the scope of the claims hereunto appended.

Figure 1:
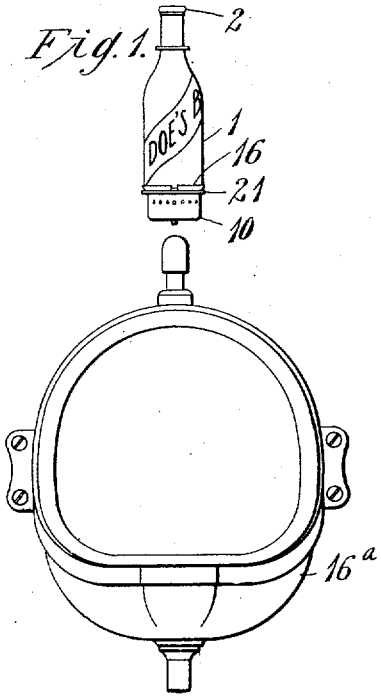
Figure 2:
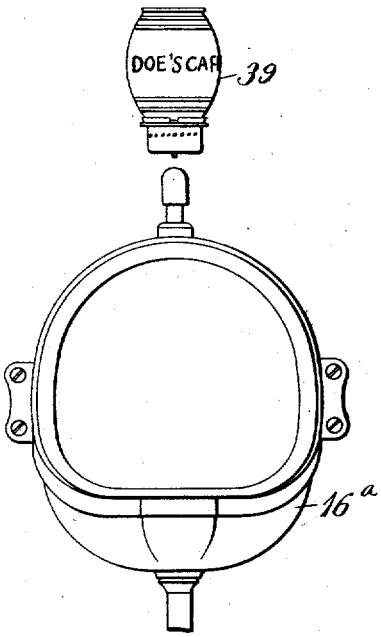
Figure 3:
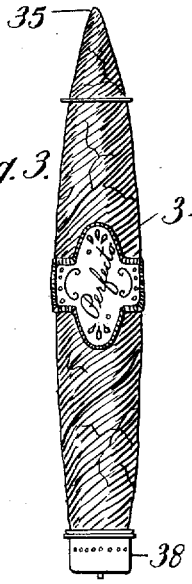
Figure 4:
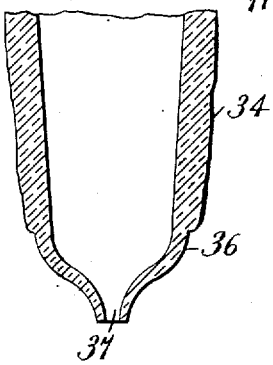
Figure 9:
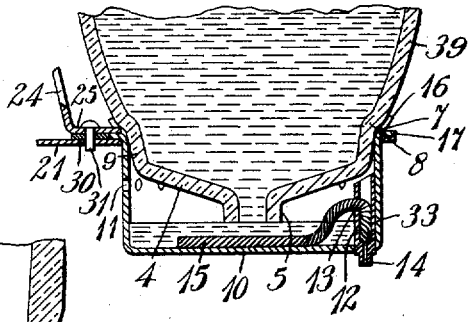
Figure 5:
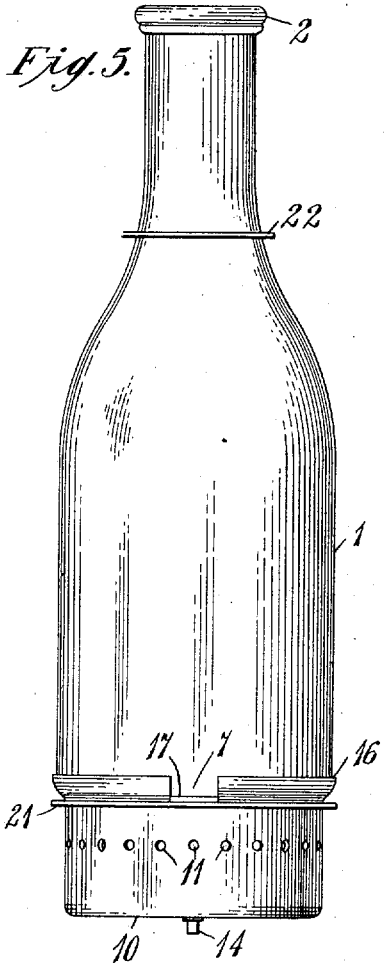
Figure 6:
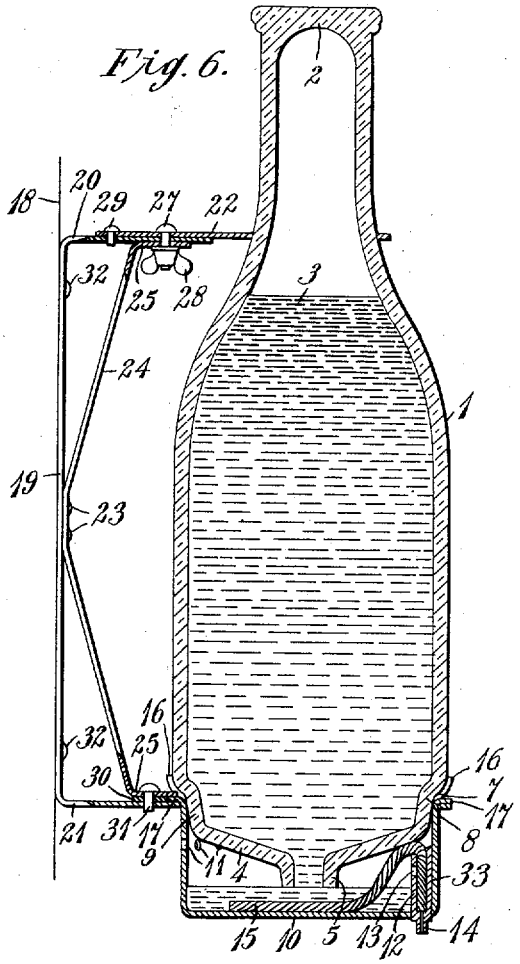
Figure 7:
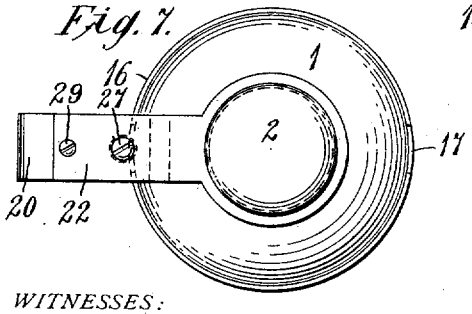
Figure 8:
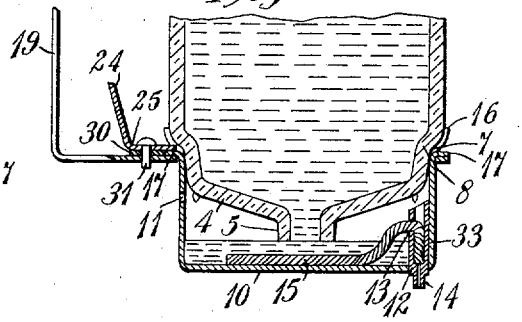

In the drawings Figure 1 is a front elevation of one form of our deodorant or disinfectant receptacle as utilized in connection with a urinal; Fig. 2 is a front elevation of another form of deodorant or disinfectant receptacle as utilized in connection with a urinal; Fig. 3 is a front elevation of another form of receptacle; Fig. 4 is a vertical sectional view of a portion of the device shown in Fig. 3; Fig. 5 is an enlarged elevation of the receptacle shown in Fig. 1; Fig. 6 is a vertical sectional view of the receptacle shown in Fig. 5 and showing also a supporting device for the receptacle; Fig. 7 is a plan view of the parts shown in Fig. 6; Fig. 8 is a sectional detail of the lower portion of a receptacle similar to that shown in Fig. 6 but showing a different arrangement of the means for discharging the disinfectant; Fig. 9 is a sectional detail of the lower portion of the receptacle shown in Fig. 2; Fig. 10 is a vertical sectional view of another form of receptacle; Fig. 11 is a sectional view of a plug feeding valve; Fig. 12 is an inverted plan of the plug feeding valve; Fig. 13 is a vertical sectional view of another form of receptacle; and Fig. 14 is a bottom plan of the device shown in Fig. 13.

In connection with the various receptacles disclosed, it may be stated that, when it is desired to disinfect or deodorize the atmosphere by means of the process of evaporation, the wick for capillary attraction may be dispensed with, but when it is desired to deodorize or disinfect a desired place or object, as well as the air, the wick is employed.

In the general form of deodorizers or disinfectants now in use, the receptacle containing the disinfectant or deodorant is supported within an outer casing that is secured to a suitable support, whereas in our invention, the outer casing is omitted and the receptacle containing the disinfectant or deodorant is connected directly to a support.

Our disinfector or deodorizer may be used for advertising purposes and, if the article desired to be advertised is a cigar, the receptacle containing the deodorant or disinfectant will be in the shape of a cigar with suitable advertising matter thereon, or the name of the advertiser, or the name of the cigar, as will be noted by reference to Fig. 3. If the disinfector or deodorant is used to advertise the products of a brewing company, the receptacle containing the disinfectant or deodorant will be in the shape of a bottle of beer or other liquid, or it may be in the shape of a keg, as clearly shown in Figs. 1 and 2, the bottle or keg carrying suitable advertising matter pertaining to the brand of beer. This idea may be carried out so that the receptacle containing the deodorant or disinfectant shall be of a contour similar to the article vended by the party using the disinfector or deodorizer for advertising purposes, or the shape of the receptacle containing the deodorant or disinfectant may be of a contour corresponding to the receptacle containing the article vended.

Referring to Figs. 1, 5 and 6 of the drawings, 1 denotes a deodorant or disinfectant receptacle of a contour similar to that of a bottle and closed at its upper end 2, the deodorant or disinfectant being indicated by the reference character 3. The bottom 4 of the receptacle is provided with a constricted depending outlet 5. The lower portion of the receptacle 1 is provided also with a shoulder 7 that is formed by a portion 8 which merges into a portion 9 of reduced diameter. The lower end of the receptacle 1 is surrounded by a receiving cup 10 that engages the shoulder 7 and is provided with a circumferentially disposed series of openings 11 and with an inwardly projecting tube 12 having a side opening 13 and terminating in a discharge nipple 14 that depends from the bottom of the cup. Within the cup 10 is arranged a wick 15 which extends into the tube 12 and is utilized for conveying the disinfectant, by capillary attraction, into the tube 12 so that it may be discharged through the nipple 14 and drip into a urinal 16[a], as shown in Fig. 1. The side of the cup 10 is of such height as to project above the part 9, and is of larger diameter than the part of the cup below it, as clearly shown in Fig. 5 and indicated by the reference character 16. The portion 16 is provided with a plurality of fastening lips 17 for a purpose to be presently referred to.

The deodorant or disinfectant receptacle is suspended from a support 18 which may be one of the walls of a room or a suitable frame work arranged in connection with a urinal, or any other suitable support. The receptacle is suspended by means of a hanger comprising a body portion 19 and upper and lower ends 20 and 21 bent at right angles thereto. The end 20 has connected thereto a retaining arm 22 having an opening to receive the neck of the bottle, as clearly shown in Fig. 6. Connected to the body portion 19, at 23, is a brace member 24 having ends 25 extending in parallel relation to the ends 20 and 21. The arm 22 is coupled to the end 20 by a screw bolt 27 provided with a wing nut 28, the bolt extending through the arm 22, end 20 and end 25. To prevent twisting of the arm 22, it is connected by a pin 29 to the end 20. Mounted upon the end 21 is a washer 30 upon which rests the lower end 25 of the brace member 24. The end 21 is of greater length than the end 20 and is provided with an opening through which extends the cup 10, as clearly shown in Fig. 6. The end 21 is located below the portion 16 of the cup and the lips 17 are bent over to rest upon it. One of the lips 17 is secured between the end 25 and the end 21 and is maintained in said position by a pin 31 which extends through the end 25, washer 30, and end 21. By reason of the location of the end 25 in the recess formed by bending down the lip 17, the cup 10 is held in position with the drip tube 14 either at the front or at the back of the disinfector or deodorizer, as may be desired. The body portion 19 of the hanger is secured to the support 18 by suitable devices 32.

The opening 13 in the tube 12, as shown in Fig. 6, allows of the use of suitable tools for positioning the end 33 of the wick 15 in the tube 12, or, if desired, as shown in Fig. 8, the wick 15 may extend through the opening 13 in the tube 12. With the exception of the different arrangement of the wick in Fig. 8, the construction is the same as that shown in Fig. 6, the same reference characters being applied thereto.

Referring to Figs. 3 and 4 of the drawings, the receptacle which is indicated by the reference character 34 is of a shape similar to that of a cigar and is closed at its upper end 35. The lower end of the receptacle is contracted at 36 to provide a tapering outlet 37. To the lower end of the receptacle 34, a cup similar to that disclosed in connection with Figs. 6 and 8, is attached, as indicated by the reference character 38. The receptacle 34 is suspended in the same manner as the receptacle 1.

Referring to Fig. 9, which denotes the lower portion of the receptacle 39 shown in Fig. 2, the said lower portion is of a construction similar to the lower portion of the receptacle shown in Fig. 6, the same reference characters being applied thereto. The cup and the wick are similar to the corresponding parts shown in Fig. 8, like reference characters being applied thereto.

Referring to Fig. 10, the receptacle is in the form of a bottle and is indicated by the reference character 40, the upper end 41 of the receptacle is closed, and the bottom 42 of the receptacle is provided with a centrally disposed outlet 43 having interior threads to which is attached a valve feeding plug 44, which is provided with a tube 45 extending upwardly into the space in the top of the receptacle and is further provided with a pair of outlet passages 46 and with a depending yoke 47. The reference character 48 denotes a cup having a circumferentially disposed series of openings 49, and a plate 50 mounted upon the bottom thereof, the said plate being provided with a centrally disposed opening into which projects the yoke 47. The cup 48 is secured to the receptacle 40 in the same manner as the cup 10 and, otherwise than that, as stated, the construction of the cup 48 is similar to the cup 10. The valve plug 44 is shown in position to shut off the discharge of the deodorant or disinfectant. If it be desired to discharge the deodorant or disinfectant, the receptacle will be turned in the cup 48. By reason of the location of the yoke 47 in the opening in the plate 50, the plug 44 will be raised to such position that the passages 46 will open into the receptacle 40 and permit a discharge of the deodorant or disinfectant.

Referring to Fig. 13 of the drawings, the receptacle is indicated by the reference character 52, and is shown as having a contour similar to that of a bottle with its mouth closed by what is known as a "crown seal". The bottom of the receptacle 52 is similar to that disclosed in Fig. 10, but its lower end is threaded at 54, to be engaged by threads 55 on the cup 56. Otherwise than as stated, the construction is the same as shown in Fig. 1. In lieu of the crown seal, we may employ any ordinary and well known form of closure that may be removed for the purpose of filling the receptacle. Whatever may be the form of the receptacle, we prefer to make it of glass, as is indicated in each of Figs. 4, 6, 8, 9, 10 and 13. An advantage gained in connection with the detachable cup is that it may be rotated until the discharge tube therefor is at the rear side of the disinfector, thus permitting of a tube being attached to the discharge nipple of the cup to convey the disinfectant to the bowl or hopper of a closet.

It will be observed by reference to Figs. 6, 8, 9, and 13, that the opening in the bottom of the receptacle is sealed by the liquid contained within the cup, and we desire to call attention again to the tube arranged within the cup and to the wick extending from the tube. The discharge of the disinfectant can be regulated according to the position of the wick, it being apparent that, if the wick extends over the upper end of the tube instead of through an opening in its side, the discharge will be slower, since the disinfectant has a greater distance to travel.

What we claim is:

1. A disinfecting device, comprising a receptacle for liquid having a reduced upper portion and a bottom outlet, a cup fitted upon the lower portion of said receptacle above the outlet, means for effecting a slow discharge of liquid from said cup, and a supporting bracket having an arm to support said cup and an arm arranged to engage the upper portion of said receptacle.

2. A disinfecting device, comprising a receptacle for liquid having a reduced upper portion and a bottom outlet, a cup fitted upon the lower portion of said receptacle above the outlet, means for effecting a slow discharge of liquid from said cup, and a supporting bracket having arms that respectively embrace said cup and the reduced upper portion of said receptacle.

3. A disinfecting device, comprising a glass receptacle for liquid having a reduced and closed upper end and a contracted lower portion terminating in a bottom outlet, a cup inclosing said contracted lower portion and attached to its periphery above the outlet, means for discharging liquid drop by drop from said cup, and supporting means engaging said cup and the reduced upper end of said receptacle.

4. A disinfecting device comprising a receptacle for liquid, a cup surrounding the lower portion of said receptacle and having means for discharging liquid therefrom at a slow rate, a valve located in the bottom of said receptacle and having a pipe connection to an air space in the upper part of the receptacle, and means for adjusting said valve by a relative rotative movement of said receptacle and said cup.

5. A disinfecting device comprising a receptacle for liquid having a bottom outlet, a cup surrounding said outlet and having means for discharging liquid therefrom at a slow rate, and a valve in said outlet having adjusting means to be actuated by said cup when rotated with reference to the receptacle.

6. A disinfecting apparatus, comprising a receptacle for liquid having a reduced upper portion and provided at its lower end with means for discharging liquid therefrom, and a bracket therefor having a pair of arms, one thereof being arranged to support said receptacle, and the other being arranged to engage the reduced upper portion of said receptacle for normally preventing removal thereof from the bracket.

7. A disinfecting apparatus, comprising a receptacle for liquid having a reduced upper portion and provided at its lower end with means for discharging liquid therefrom, and a bracket therefor comprising a base and a pair of arms, one thereof being arranged to support said receptacle, and the other being detachably secured to said base and arranged to engage the reduced upper portion of said receptacle for normally preventing removal thereof from the bracket.

8. A disinfecting device, comprising a receptacle for liquid having a bottom outlet, a cup fitted upon the lower end of said receptacle above the outlet, means located at one side of said cup for discharging liquid drop by drop therefrom, an arm for supporting said cup, and a member for supporting said receptacle, said arm being so constructed and arranged as to permit rotation of the cup therein, and said receptacle being rotatable in said member and with reference to said cup.

9. A disinfecting device, comprising a glass receptacle having substantially all of its outer surface exposed and provided with a bottom outlet, a cup attached to the periphery of the receptacle above the outlet and provided at one side with means for effecting a slow discharge of liquid, means for supporting the receptacle arranged to permit rotation of the receptacle with reference thereto, supporting means for the cup, and means on the cup engaging its supporting means and arranged to hold the cup in different positions.

In testimony whereof, we have hereunto set our hands.

JOSEPH WILLIAMS.
WILLIAM H. WILLIAMS.
EDWARD R. WILLIAMS.

Witnesses:
JOHN G. WALTER,
EDWARD J. WALTER.

Copies of this patent may be obtained for five cents each, by addressing the "Commissioner of Patents, Washington, D. C."